(12) United States Patent
Biafore et al.

(10) Patent No.: US 10,424,011 B2
(45) Date of Patent: Sep. 24, 2019

(54) SYSTEMS AND METHODS FOR SHARED LENDING RISK

(75) Inventors: Louis Steven Biafore, La Jolla, CA (US); Theodore James Crooks, La Mesa, CA (US); Christoper Deboer, Santa Barbara, CA (US); Krishna Gopinathan, San Diego, CA (US)

(73) Assignee: GAIN CREDIT HOLDINGS, INC, La Jolla, CA (US)

( * ) Notice: Subject to any disclaimer, the term of this patent is extended or adjusted under 35 U.S.C. 154(b) by 0 days.

(21) Appl. No.: 13/363,249

(22) Filed: Jan. 31, 2012

(65) Prior Publication Data

US 2013/0110655 A1    May 2, 2013

Related U.S. Application Data

(60) Provisional application No. 61/554,955, filed on Nov. 2, 2011.

(51) Int. Cl.
*G06Q 40/00* (2012.01)

(52) U.S. Cl.
CPC .................................. *G06Q 40/00* (2013.01)

(58) Field of Classification Search
CPC ......... G06Q 20/20; G06Q 30/06; G06Q 40/00
USPC ................. 705/16, 26.1, 35–40, 44
See application file for complete search history.

(56) References Cited

U.S. PATENT DOCUMENTS

| | | | |
|---|---|---|---|
| 2,007 A | 3/1841 | Fahner et al. | |
| 5,262,941 A | 11/1993 | Saladin et al. | |
| 6,119,103 A | 9/2000 | Basch | |
| 6,587,841 B1 | 7/2003 | DeFrancesco et al. | |
| 7,054,842 B2 | 5/2006 | James et al. | |
| 7,181,427 B1 * | 2/2007 | DeFrancesco et al. | 705/38 |
| 7,310,617 B1 | 12/2007 | Cunningham | |
| 7,383,224 B2 * | 6/2008 | Huennekens et al. | 705/39 |
| 7,539,628 B2 * | 5/2009 | Bennett et al. | 705/26.41 |
| 7,542,922 B2 * | 6/2009 | Bennett et al. | 705/26.8 |
| 7,606,760 B2 * | 10/2009 | Hutchison et al. | 705/39 |
| 7,620,597 B2 * | 11/2009 | Eze | 705/38 |
| 7,720,743 B1 * | 5/2010 | Marks | 705/37 |
| 7,756,780 B2 * | 7/2010 | Drummond et al. | 705/38 |
| 7,822,605 B2 | 10/2010 | Zigel et al. | |
| 7,853,498 B2 * | 12/2010 | Finley et al. | 705/35 |
| 7,908,210 B2 * | 3/2011 | Huber et al. | 705/38 |
| 7,912,842 B1 | 3/2011 | Bayliss | |
| 7,970,690 B2 * | 6/2011 | Diana et al. | 705/37 |
| 7,991,689 B1 * | 8/2011 | Brunzell et al. | 705/38 |
| 7,996,305 B2 * | 8/2011 | Seibert et al. | 705/38 |
| 8,001,040 B2 * | 8/2011 | Keithley | 705/38 |
| 8,001,042 B1 * | 8/2011 | Brunzell et al. | 705/38 |
| 8,010,450 B2 * | 8/2011 | Palmer | 705/39 |

(Continued)

OTHER PUBLICATIONS

PCT International Search Report of PCT/US12/62848; dated Nov. 23, 2012.

(Continued)

*Primary Examiner* — Andrew Joseph Rudy
(74) *Attorney, Agent, or Firm* — DLA Piper LLP (US)

(57) ABSTRACT

The shared lending risk system and method provide a lead scoring engine that generates a score representing an assessment of the credit risk of the transaction that is based on an assessment of the merchant, purchaser and product. The score is provided to a pool of lenders and a credit product is selected from the pool based on the score.

13 Claims, 4 Drawing Sheets

(56) References Cited

U.S. PATENT DOCUMENTS

| | | | |
|---|---|---|---|
| 8,019,678 B2* | 9/2011 | Wright et al. | 705/38 |
| 8,020,763 B1* | 9/2011 | Kowalchyk | G06Q 20/102 |
| | | | 235/380 |
| 8,036,941 B2* | 10/2011 | Bennett et al. | 705/26.1 |
| 8,055,579 B2* | 11/2011 | Davies | G06Q 40/00 |
| | | | 705/35 |
| 8,108,272 B2* | 1/2012 | Sorbe | G06Q 20/10 |
| | | | 235/384 |
| 8,131,590 B1 | 3/2012 | Armstrong | |
| 8,214,292 B2* | 7/2012 | Duggal et al. | 705/44 |
| 8,219,487 B2* | 7/2012 | Villacorta et al. | 705/38 |
| 8,244,629 B2* | 8/2012 | Lewis et al. | 705/38 |
| 8,249,967 B2 | 8/2012 | Park | |
| 8,251,702 B2* | 8/2012 | Marks | 434/238 |
| 8,336,766 B1 | 12/2012 | Miller et al. | |
| 8,527,401 B2* | 9/2013 | DeRoy | G06Q 10/10 |
| | | | 705/35 |
| 8,600,875 B2* | 12/2013 | Ciurea | 705/38 |
| 8,626,663 B2* | 1/2014 | Nightengale et al. | 705/44 |
| 8,706,631 B2* | 4/2014 | Gupta | G06Q 30/0601 |
| | | | 455/406 |
| 8,725,595 B1* | 5/2014 | Siegel | G06Q 10/087 |
| | | | 705/27.2 |
| 8,725,597 B2* | 5/2014 | Mauseth et al. | 705/28 |
| 8,756,099 B2* | 6/2014 | Keithley | G06Q 20/401 |
| | | | 705/14.1 |
| 8,799,150 B2* | 8/2014 | Annappindi | G06Q 40/02 |
| | | | 705/322 |
| 9,094,291 B1* | 7/2015 | Jackson | G06F 21/604 |
| 9,495,652 B1* | 11/2016 | Cook | G06Q 10/06313 |
| 9,619,800 B1 | 4/2017 | Valdyanathan et al. | |
| 9,652,813 B2* | 5/2017 | Gifford | G06Q 50/265 |
| 10,049,359 B2* | 8/2018 | Lyda | G06Q 40/00 |
| 10,089,683 B2* | 10/2018 | Dominguez | G06Q 20/40 |
| 2003/0009418 A1 | 1/2003 | Green et al. | |
| 2003/0065624 A1 | 4/2003 | James et al. | |
| 2004/0030649 A1 | 2/2004 | Nelson et al. | |
| 2004/0107132 A1 | 6/2004 | Honarvar | |
| 2004/0138992 A1 | 7/2004 | DeFrancesco et al. | |
| 2004/0148211 A1 | 7/2004 | Honarvar | |
| 2004/0181441 A1 | 9/2004 | Fung | |
| 2005/0182713 A1 | 8/2005 | Marchesi | |
| 2005/0283753 A1 | 12/2005 | Ho | |
| 2006/0089894 A1 | 4/2006 | Balk et al. | |
| 2006/0285665 A1 | 12/2006 | Wasserblat et al. | |
| 2007/0005357 A1 | 1/2007 | Moran et al. | |
| 2007/0016419 A1 | 1/2007 | Lee et al. | |
| 2007/0067195 A1 | 3/2007 | Fahner et al. | |
| 2008/0082418 A1 | 4/2008 | Fordyce et al. | |
| 2009/0024517 A1 | 1/2009 | Crooks | |
| 2009/0070255 A1 | 3/2009 | Muktevi | |
| 2009/0076972 A1 | 3/2009 | Witchel et al. | |
| 2009/0106178 A1 | 4/2009 | Chu et al. | |
| 2009/0281951 A1 | 11/2009 | James et al. | |
| 2010/0057609 A1 | 3/2010 | Sibson | |
| 2010/0305960 A1 | 12/2010 | Gutierrez et al. | |
| 2011/0302084 A1 | 12/2011 | Melik-Aslanian et al. | |
| 2012/0030116 A1 | 2/2012 | Shirey | |
| 2012/0061464 A1 | 3/2012 | Kingston et al. | |
| 2012/0173465 A1 | 7/2012 | Hore | |
| 2012/0262296 A1 | 10/2012 | Bezar | |
| 2012/0323787 A1 | 12/2012 | Nelsen | |
| 2013/0346274 A1 | 12/2013 | Ferdinand | |
| 2014/0156568 A1 | 6/2014 | Ganguly | |
| 2014/0180675 A1 | 6/2014 | Neuhauser et al. | |

OTHER PUBLICATIONS

PCT Written Opinion of the International Search Authority of PCT/US12/62848; dated Nov. 23, 2012.

Kamm et al.; "Learning the Mel-Scale and Optimal TVN Mapping"; dated 1993; (8 pgs.).

Jensen et al.; "Evaluation of MFCC Estimation Techniques for Music Similarity"; dated 2006; (6 pgs.).

Kinnunen et al.; "An Overview of Text-Independent Speaker Recognition: from Features to Supervectors"; dated Jul. 1, 2009; (30 pgs.).

Kumar et al.; "Delta-Spectral cepstral coefficients for robust speech recognition"; dated 2010; (4 pgs.).

Wikipedia—KXEN Inc.; http://en.wikipedia.org/wiki/KXEN_Inc.; printed Mar. 11, 2016; (2 pgs.).

SAP Predictive Analytics; http://www.sap.com/pc/analytics/predictive-analytics/software/infiniteinsight/index.html; printed Mar. 11, 2016; (8 pgs.).

SAP Says KXEN deal will bring automated predictive analytics capabilities to business users, not just data scientists; http://www.informationweek.com/software/information-management/sap-buying-kxen-for-predictive-analytics-tools/d/d-id/1111488?; printed Mar. 11, 2016; (8 pgs.).

CrunchBase—KXEN Inc.; https://www.crunchbase.com/organization/kxen; printed Mar. 11, 2016; (5 pgs.).

Abel Rodriguez and Gavino Puggioni; "Mixed frequency models: Bayesian approaches to estimation and prediction"—26:293-311 (19 pages) (2010).

Anthony. Cooperation in Microcredit Borrowing Groups: Identity, Sanctions and Reciprocity in the Production of Collective Goods. American Sociological Review, vol. 70. 2005. [retrieved on Feb. 25, 2012]. Retrieved from the internet: URL<http://www.dartmouth.edu/~socy/pdfs/da_coopinmicrocredit_07.pdf> entire document (20 pages).

* cited by examiner

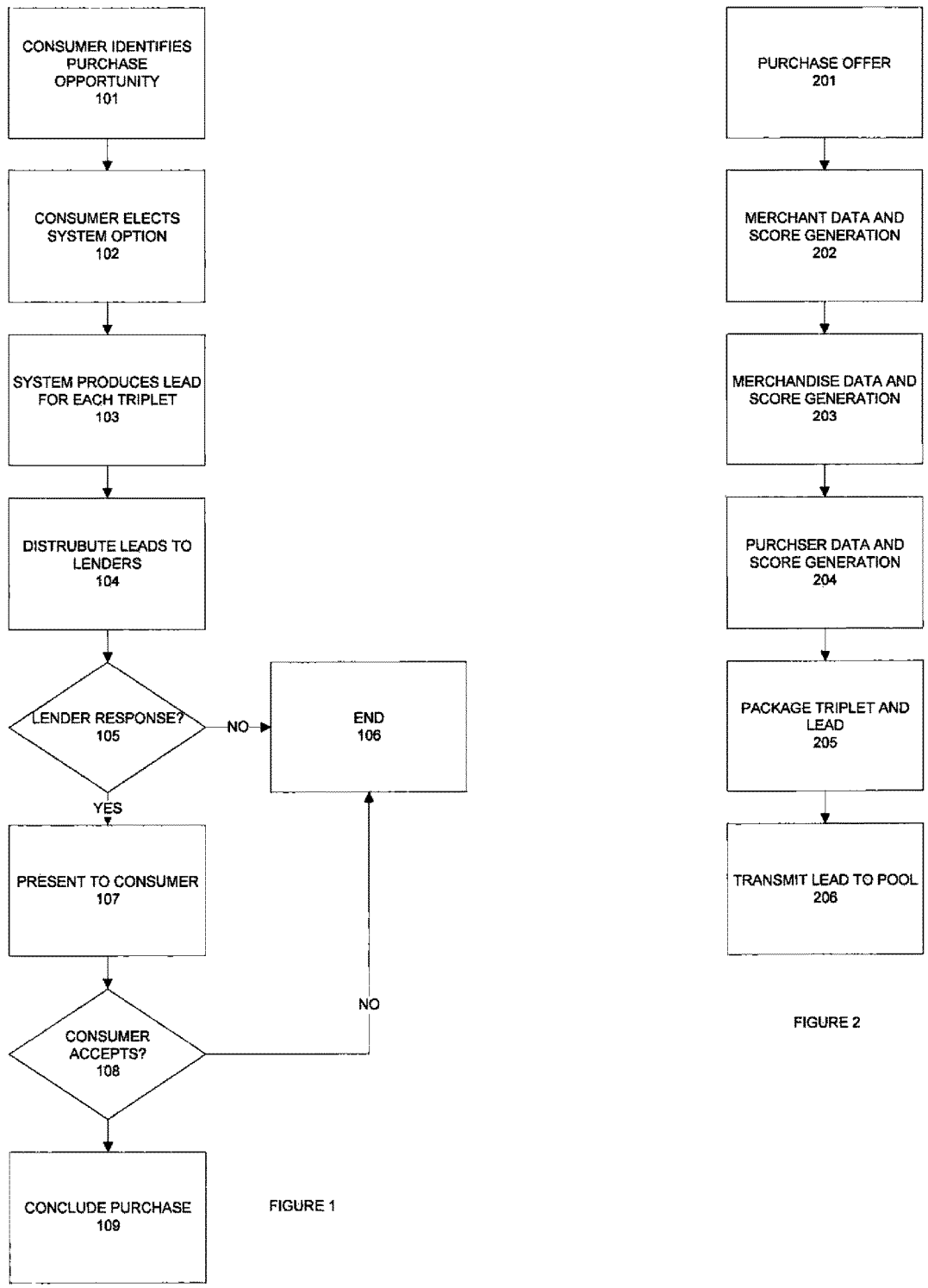

SYSTEMS AND METHODS FOR SHARED LENDING RISK

This patent application claims priority to U.S. Provisional Patent Application No. 61/554,955 filed on Nov. 2, 2011 entitled SYSTEMS AND METHODS FOR SHARED LENDING RISK which is incorporated by reference herein in its entirety.

BACKGROUND OF THE SYSTEM

1. Technical Field

The embodiments described herein relate to processes for making credit decisions and more particularly to systems and method for sharing risks in lending transactions.

2. Related Art

When a consumer desires to purchase a product or service but does not have the full amount of the purchase price, the consumer will often make the purchase on credit. This may be accomplished via a credit card, seller provided financing, or some combination of the two. If the consumer does not have credit available, the consumer may sometimes apply for credit with a seller or credit provider and wait for an evaluation period before being approved.

Sometimes, such as an urgent or emergency situation, or because an opportunity is time limited, a customer desires to make a purchase but is unable to do so due to lack of credit. The prior art process in such a situation is inefficient in that consumers are forced to abandon purchases, work through independent channels to obtain financing, and then re-start the purchase process. This can take days to weeks to complete. In specific cases where the consumer is purchasing a "large ticket" item such as an automobile or home appliance, the merchant may offer financing, but this is arranged with a specific single financial institution and therefore lacks the usual free-market forces. Because of the delays involved, a consumer may miss out on a purchase opportunity or the seller may miss out on an otherwise credit-worthy customer.

When credit of financing is available, the consumer typically is required to finance the full purchase price of the product/service they are buying and the consumer is typically provided specific terms that they can accept or reject for the transaction. In most cases, the consumer cannot modify the credit offer to meet their specific needs. It is an "all or nothing" offer.

Like the purchaser, the merchant also typically has limited options. A merchant may offer in-house financing, may offer third-party financing, or may not offer any point-of-sale financing. In cases other than in-house financing, the merchant is not able to share in the risk/reward (downside/upside) of financing.

The disadvantages of the prior art credit process is a lack of availability and a lack of customization for the consumer, and a lack of flexibility and ability to participate in financing upsides for the merchant.

SUMMARY

The system enables a merchant to choose the degree in which to participate in financing of a customer. This enables a new revenue stream for merchants beyond retail margin. The system also enables merchants to reach new under-banked consumers who were previously unable to buy from the merchant because they lacked the cash and/or credit to do so. The system also allows a consumer to participate in modification of credit terms by providing a customizable credit product.

BRIEF DESCRIPTION OF THE DRAWINGS

Features, aspects, and embodiments are described in conjunction with the attached drawings, in which:

FIG. 1 is a flow diagram illustrating the operation of an embodiment of the system.

FIG. 2 is a flow diagram illustrating the generation of a triplet lead in an embodiment of the system.

DETAILED DESCRIPTION OF THE SYSTEM

Figure 3:
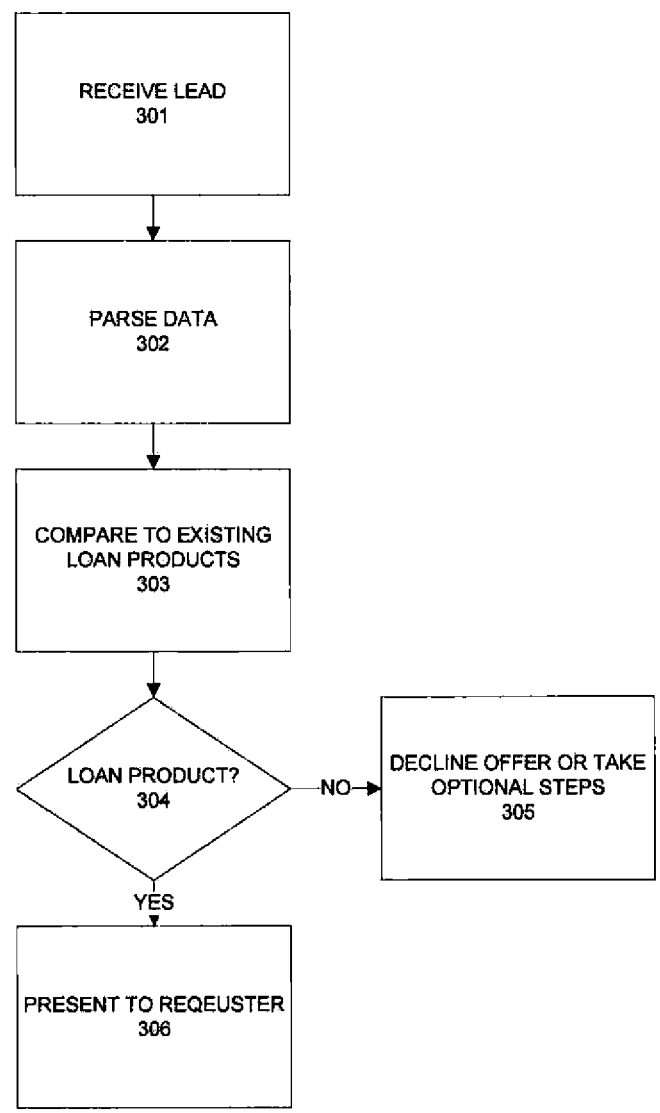
FIG. 3 is a flow diagram illustrating the presentation of a lead to a lender pool in an embodiment of the system.

The system provides a method and apparatus to coordinate credit decisions and terms among a consumer, a merchant, and a credit market (population of lenders). This allows greater flexibility on the part of each participant to permit a credit transaction that would not otherwise take place under prior art schemes. For example, the system allows the ability to quickly create credit offers to customers who have no or insufficient credit for a particular purchase. The consumer has the opportunity to modify terms to improve the opportunity to obtain credit or to improve the terms of a credit offer. Members of a lender pool can determine a level of participation in a proposed credit transaction depending on their level of risk aversion or risk assumption. As a result, the system allows the sharing of risk between merchants, lenders, and consumers so that credit transactions can be concluded in situations where prior art systems would fail.

Using the system, consumers have a payment option that helps them get the financing they need, in real-time, at the point-of-sale, relative to specific product/service purchases, at terms determined by an active "conversation" between the consumer, merchant and an active and open credit market. The system in one embodiment considers a "triplet" where the triplet is comprised of a consumer, a merchant, and a purchased item (whether product or service). The system assesses risk for the triplet.

The system distributes the risk-assessed triplet as a lead to an open market of lenders. (may be a ping-tree (sequential distribution) or broadcast (parallel distribution), or any combination of the sequential and parallel distribution. Analytics may be used to optimize how leads are distributed, such as ordering of any sequential distribution). The system forms a real-time response to the consumer (in the form of offers for financing) from the open market of lenders. The system enables the merchant to act as a lender (to whatever degree they choose) and therefore participate in the risk/reward of financing in addition to, or instead of, third party lenders. The system allows the consumer to control the terms of the financing they are seeking (the fraction of the total purchase-price they want to finance, the size, number and frequency of payments they wish to make, and the like).

In one embodiment, the system collects the data needed to assess the risk of not only the consumer but the combination of the consumer, merchant and the specific product/service the consumer would like to finance (i.e. the triplet). The system includes analytic models to perform risk assessments (based upon statistical models). These risk assessments include both credit and fraud risk of the triplet.

Product/Service Risk

In one embodiment of the system, risks are analyzed for specific products and/or services that may be purchased. This analysis may be for specific products or services, or for particular classes of products or services. For example, it may be determined that some specific purchases (car repair, plumbing repair, tuition, etc.) may represent emergencies that need immediate action, and may in some circumstances imply lower risk than other types of purchases made by the same/similar person. The recoverability (or perceived recoverability) of the product or service can also impact the risk associated with a product or service.

Consumer Risk

The system also contemplates a number of ways to analyze the creditworthiness, and thus risk associated with, a consumer. The system contemplates the use of prior art credit risk assessment techniques such as credit reports, bank statements, employment status, income, assets, and the like. In addition, the system allows the consideration of additional factors including assigning weight to factors such as the referencers of a consumer, the willingness of the consumer to pay at least a portion of the purchase price, and the like. The system uses analytics to provide a risk score associated with the consumer. The score of the system may coincide with, or vary from, credit scores associated with credit reporting agencies.

Merchant Risk

In the system, the merchant can establish parameters related to the risk that the merchant is willing to take on concerning the transaction. In addition, the merchant has the opportunity to participate fully or partially in the credit transaction, so that the merchant has the opportunity for upside benefits from a credit transaction when the merchant so chooses.

Lender Market

In one embodiment of the system, a pool of lenders is established. The lenders can indicate parameters of risk in the merchant, consumer, and goods that the lender is willing to consider. This is typically a range of risk. Each lender may also have pre-determined credit packages for each level of risk within the acceptable range. For example, for riskier credit transactions, a lender may have a credit package with higher interest rates, higher monthly payments, fewer monthly payments, a limit on how much of the transaction the lender will undertake, and the like.

In other cases, the lender establishes certain types of credit transactions for which the lender would like to be notified in order to bid to participate in the transaction on a customized basis.

In one embodiment of the system, it is desired to use analytics to identify a subset of the lenders in the pool who may wish to participate in any one transaction, eliminating the need to waste time interacting with lenders who have no interest.

The analytic models of the system look at the available data (including alternate data sources, beyond standard credit bureaus) and produce an assessment of the relevant risks. The system includes a payment option that online merchants will offer all potential customers as part of the checkout process. The offline system includes purchases made through a prepaid debit card that may be connected with lenders in a variety of ways, including web and real-time mobile-enabled credit decisions (for example requesting financing for a specific purchase, receiving the financing and making an offline purchase using a physical card.

When a consumer chooses to make a purchase with the system, the analytic models will then produce a qualified lead (a specific consumer, merchant and products/services to be financed, along with identity-verification and risk scores produced by the analytic models). This qualified lead may then distributed (potentially sold) via distribution to a marketplace of lenders. The system distributes leads via a variety of methods including ping-post (wherein lenders decide ahead of time what their bid will be for leads and each lead is then distributed to each lender in bid order from highest to lowest until reaching a lender that decides to offer financing), broadcast (wherein each lead is sent simultaneously to all lenders wishing to consider the lead, and any/all lenders may respond with a financing offer), or other distribution method.

The system is analytics-enabled, operates in real-time, and creates an open-market for financing purchase transactions at the point of sale. The system provides value to all three main participants in the transaction, consumers, merchants and lenders. The system can operate online and offline as desired.

Consumers gain value because they can more readily purchase the products/services they need, from any merchant they choose (online or offline), with the ability to craft financing terms to fit their needs, with the confidence that multiple, well-informed lenders are competing for their business, with immediate access to a variety of offers from a variety of lenders.

Merchants gain value because they can sell products/services they would not otherwise be able to sell to consumers with whom they would not otherwise be able to transact, and because they have flexible options to participate in financing upside to any degree they choose.

Lenders gain value because they can confidently serve a new, motivated population of consumers seeking credit, and make use of the additional data available at the PUS to make profitable lending decisions based upon a new mix of data relating to triplets.

Purchase

FIG. 1 is a flow diagram illustrating the operation of an embodiment of the system in making a purchase. At step 101 a consumer visits an online merchant site or physical merchant store and identifies specific products/services they want to buy. At step 102 the consumer decides to use the system as an option for payment. The consumer specifies the desired financing, with control over key terms such amount to finance and details of the repayment schedule. In one embodiment, the consumer does not specify the credit transaction terms.

The system performs a series of real-time functions to produce a scored, qualified financing lead for each triplet (consumer plus product/service being purchased plus merchant) at step 103. This step includes, but is not limited to, identity verification and execution of analytic models to produce a set of risk scores (for fraud risk, credit risk, etc.). In one embodiment, the lead may include a merchant discount. For example, the merchant may be willing to take immediate payment of some percentage (e.g. 90%) of the purchase price in return for the lending pool agreeing to undertake financing of the purchase. This provides the lending pool with additional margin that can be used to underwrite riskier loans and credit transactions, increasing the possible volume of transactions. In other instances, the merchant may be willing to take some percentage of the purchase price in immediate cash and some remaining portion as part of the loan repayment process. Since the repayment terms includes interest payments, this allows the merchant to share in the upside (additional interest revenue) in part and to receive immediate payment in part. This shared risk also allows the lending pool to undertake riskier transactions.

At step 104 the system oversees the distribution of the qualified financing lead to a set of lenders.

If the lead matches the parameters of at least one of the lenders, the lenders respond, producing the market-defined best financing option(s) for the consumer. At decision block 105 it is determined if one or more lenders have responded to the lead with an offer. If not, the system ends at step 106. If so, the consumer receives the financing offers online (they see the terms of the financing options on screen as part of the checkout process) at step 107.

At decision block 108 the consumer chooses to accept or reject the financing terms that are offered. If the reject, the system ends at step 106. If the consumer accepts a financing offer, the purchase is completed at step 109.

Lead Generation

FIG. 2 is a flow diagram illustrating the generation of a triplet lead in an embodiment of the system. At step 201, the system receives a purchase offer. The purchase offer includes the name of a purchaser, the merchandise (or service) and the merchant offering the merchandise. At step 202 the system pulls data for the merchant. This may be a pre-calculated score for the merchant based on prior analysis. In one embodiment it may be a dynamically generated score based on present and past activity of the merchant and the success or failure of prior credit transactions associated with the merchant. This historical merchant data includes, but is not limited to, information about past purchases made by all consumers, and the associated detailed data for these other consumers (including their transactions with the merchant or with other merchants, as well as other information that may reflect their credit risk). This historical merchant data may also include data about products that the merchant sells (different from the one specified in the current transaction).

At step 203 the system pulls data for the merchandise. As with the merchant, this data may be a pre-calculated score for the merchandise or it may be a dynamically calculated score based on market conditions, prior credit transactions associated with that merchandise, or other factors. The analysis may include current and past data related to the product (or set of related products, or product category at any level within the space of products) that the consumer has specified for purchase. This historical product data includes, but is not limited to, information about past purchases other consumers have made where they have purchased the same or similar (or same product category) as the product in the current transaction, and the associated detailed data for these other consumers (including their transactions with the merchant or with other merchants, as well as other information that may reflect their credit risk). This historical product data also includes data relating to other merchants (different from the one specified in the current transaction) that have sold the same or similar product (product category) in the past.

At step 204 the system pulls data from a database for the purchaser. In one embodiment, the purchaser is an opt-in member of the system and has provided background information about himself for evaluation. This information can be of the type described in U.S. patent application Ser. No. 12/167,962 filed on Jul. 3, 2008 entitled "SYSTEMS AND METHODS FOR MAKING STRUCTURED REFERENCE CREDIT DECISIONS" and incorporated by reference herein in its entirety. In addition, the purchaser may have a paycard of the type described in U.S. patent application Ser. No. 13/280,763 filed on Oct. 25, 2011 entitled "SYSTEMS AND METHODS FOR SINGLE NUMBER PAN VIRTUAL/PHYSICAL CARD" and incorporated by reference herein in its entirety.

If the purchaser is not an opt-in member of the system, the system may also access existing credit check databases such as credit bureaus, banks, and the like in order to generated a score for the purchaser.

At step 205 the system packages the scores from the merchant, merchandise, and purchaser into a triplet score, along with the amount to be financed into a lead. The lead also includes any discount that the merchant has agreed to in advance for the transaction. The triplet score may be a single score derived from all of the data describing the consumer, merchant and merchandise, it may be any combination (a sum, for example) of the three scores one each for the consumer, merchant and merchandise, or it may be presented as the individual score for each member of the triplet. At step 206 the system sends the lead to a lender pool.

Pool Operation

FIG. 3 is a flow diagram illustrating the operation of the lender pool on a lead that is presented from the system. At step 301 the lead is received. At step 302 the lead is parsed and a plurality of factors are identified, including the triplet score, amount to be financed, any terms that the purchaser has requested (if any), any merchant discount (e.g. reduced payment and/or shared risk of repayment) offered by a merchant, and the like.

At step 303 the system compares the loan parameters to loan products in the database to see if any products will be available for the transaction. For example, some lenders may not loan above or below a certain purchase price, beyond a certain number of payments, below a certain interest rate, or below one or more (of the sum of) the triplet scores. At decision bock 304 it is determined if there are qualifying loan products. If there are no loan products within the parameters, the system declines the lead or takes optional action at step 305.

If there are qualifying loan products within the parameters, the system sends all qualifying packages to the requester at step 306. At this point the system operates as in steps 107 et seq. of FIG. 1.

Optional Steps

In one embodiment, if there are no existing loan products that satisfy the parameters of the lead, the system may take other steps to attempt to provide a loan product. The members of the loan pool may have standing orders to be contacted or pinged in situations where no existing loan product satisfies the lead. This allows a lender to make a manual decision on risk if desired and accept the lead as-is, even though it is out of the pre-established parameters. In one embodiment, the lender might counteroffer with some modified loan terms (e.g. higher interest, shorter payments, more merchant participation in risk, larger discount, etc.) to see if a deal can still be made.

System Structure

Figure 4:
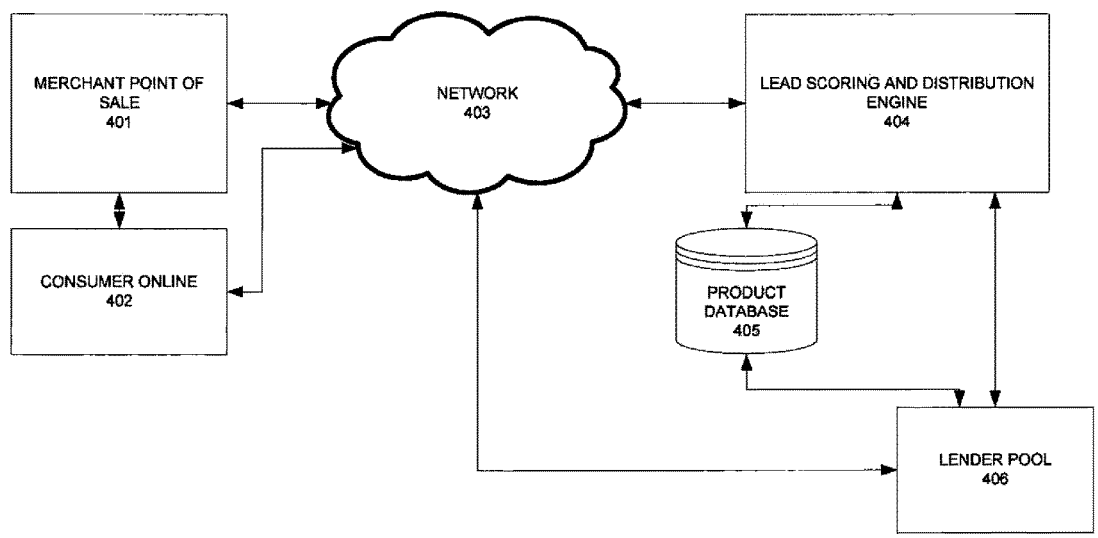
FIG. 4 is a block diagram of an embodiment of the system.

FIG. 4 is a block diagram of an embodiment of the system. The system includes a merchant point of sale location 401 that can be accessed by a consumer physically and/or online. A consumer online presence 402 can also use the system to purchase goods via the interne. The merchant 401 and consumer 402 access the system via a network 403 such as the Internet.

The system includes a lead scoring and distribution engine 404 which is used to process leads that are provided to the system and to compare to loan products in the database 405. The engine 404 can also communicate with the lender pool 406 when direct communication is desired. The lender pool can communicate with the system directly of via the network 403 as desired. The lender pool can determine parameters of loan products and provide them to the database 405. The lender can also modify previously uploaded products as conditions change.

In one embodiment, the system implements an iterative communication process among the consumer, merchant and lenders wherein any party may request modification of the transaction itself (example, merchant might reduce the price in order to make financing "work" so the transaction can succeed) or financing offer (example, a lender may modify financing terms to meet a consumer request or need in order to allow the transaction to succeed). (This means that the process may involve iteration of the loop that analyzes consumer, product and merchant, presents the transaction to a set of lenders, and presents financing offers to the consumer. The solution facilitates this interactive, iterative "dialog" among all parties (consumer, merchant and lender) to reach a final financing solution acceptable to all parties (consumer, merchant and lenders).

Embodiment of Computer Execution Environment (Hardware)

Figure 5:
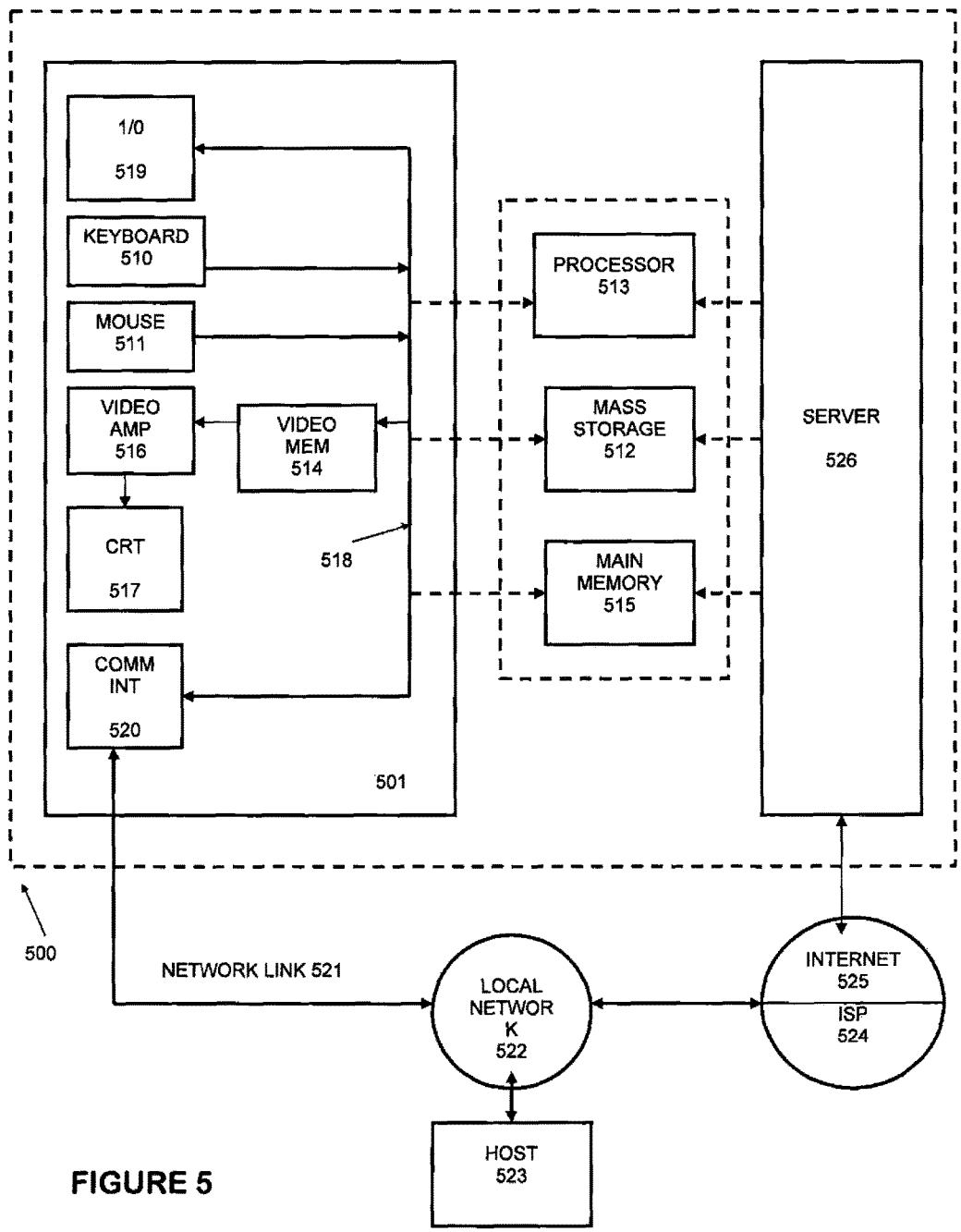
FIG. 5 is an example computer environment.

An embodiment of the system can be implemented as computer software in the form of computer readable program code executed in a general purpose computing environment such as environment 500 illustrated in FIG. 5, or in the form of bytecode class files executable within a Java.™. run time environment running in such an environment, or in the form of bytecodes running on a processor (or devices enabled to process bytecodes) existing in a distributed environment (e.g., one or more processors on a network). A keyboard 510 and mouse 511 are coupled to a system bus 518. The keyboard and mouse are for introducing user input to the computer system and communicating that user input to central processing unit (CPU 513. Other suitable input devices may be used in addition to, or in place of, the mouse 511 and keyboard 510. I/O (input/output) unit 519 coupled to bi-directional system bus 518 represents such I/O elements as a printer, A/V (audio/video) I/O, etc.

Computer 501 may include a communication interface 520 coupled to bus 518. Communication interface 520 provides a two-way data communication coupling, via a network link 521 to a local network 522. For example, if communication interface 520 is an integrated services digital network (ISDN) card or a modem, communication interface 520 provides a data communication connection to the corresponding type of telephone line, which comprises part of network link 521. If communication interface 520 is a local area network (LAN) card, communication interface 520 provides a data communication connection via network link 521 to a compatible LAN. Wireless links are also possible. In any such implementation, communication interface 520 sends and receives electrical, electromagnetic or optical signals which carry digital data streams representing various types of information.

Network link 521 typically provides data communication through one or more networks to other data devices. For example, network link 521 may provide a connection through local network 522 to local server computer 523 or to data equipment operated by ISP 524. ISP 524 in turn provides data communication services through the world wide packet data communication network now commonly referred to as the "Internet" 525 Local network 522 and Internet 525 both use electrical, electromagnetic or optical signals which carry digital data streams. The signals through the various networks and the signals on network link 521 and through communication interface 520, which carry the digital data to and from computer 500, are exemplary forms of carrier waves transporting the information.

Processor 513 may reside wholly on client computer 501 or wholly on server 526 or processor 513 may have its computational power distributed between computer 501 and server 526. Server 526 symbolically is represented in FIG. 5 as one unit, but server 526 can also be distributed between multiple "tiers". In one embodiment, server 526 comprises a middle and back tier where application logic executes in the middle tier and persistent data is obtained in the back tier. In the case where processor 513 resides wholly on server 526, the results of the computations performed by processor 513 are transmitted to computer 501 via Internet 525, Internet Service Provider (ISP) 524, local network 522 and communication interface 520. In this way, computer 501 is able to display the results of the computation to a user in the form of output.

Computer 501 includes a video memory 514, main memory 515 and mass storage 512, all coupled to bi-directional system bus 518 along with keyboard 510, mouse 511 and processor 513.

As with processor 513, in various computing environments, main memory 515 and mass storage 512, can reside wholly on server 526 or computer 501, or they may be distributed between the two. Examples of systems where processor 513, main memory 515, and mass storage 512 are distributed between computer 501 and server 526 include thin-client computing architectures and other personal digital assistants, Internet ready cellular phones and other Internet computing devices, and in platform independent computing environments, The mass storage 512 may include both fixed and removable media, such as magnetic, optical or magnetic optical storage systems or any other available mass storage technology. The mass storage may be implemented as a RAID array or any other suitable storage means. Bus 518 may contain, for example, thirty-two address lines for addressing video memory 514 or main memory 515. The system bus 518 also includes, for example, a 32-bit data bus for transferring data between and among the components, such as processor 513, main memory 515, video memory 514 and mass storage 512. Alternatively, multiplex data/address lines may be used instead of separate data and address lines.

In one embodiment of the invention, the processor 513 is a microprocessor such as manufactured by Intel, AMD, Sun, etc. However, any other suitable microprocessor or microcomputer may be utilized, including a cloud computing solution. Main memory 515 is comprised of dynamic random access memory (DRAM). Video memory 514 is a dual-ported video random access memory. One port of the video memory 514 is coupled to video amplifier 519. The video amplifier 519 is used to drive the cathode ray tube (CRT) raster monitor 517. Video amplifier 519 is well known in the art and may be implemented by any suitable apparatus. This circuitry converts pixel data stored in video memory 514 to a raster signal suitable for use by monitor 517. Monitor 517 is a type of monitor suitable for displaying graphic images.

Computer 501 can send messages and receive data, including program code, through the network(s), network link 521, and communication interface 520. In the Internet example, remote server computer 526 might transmit a requested code for an application program through Internet 525, ISP 524, local network 522 and communication interface 520. The received code maybe executed by processor 513 as it is received, and/or stored in mass storage 512, or other non-volatile storage for later execution. The storage may be local or cloud storage. In this manner, computer 500 may obtain application code in the form of a carrier wave. Alternatively, remote server computer 526 may execute applications using processor 513, and utilize mass storage 512, and/or video memory 515. The results of the execution at server 526 are then transmitted through Internet 525, ISP 524, local network 522 and communication interface 520. In this example, computer 501 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method of providing a credit product comprising:
   in a computer system;
   receiving a consumer indication of a purchase of a good or a service;
   generating, in a lead scoring and distribution engine, a triplet risk score for a transaction with the consumer for purchase of the good or the service, the triplet risk score representing analysis of a merchant risk for the transaction, a purchaser risk for the transaction including credit worthiness of the consumer, and a product risk for the transaction;
   providing the triplet risk score for the transaction through a communication link to a pool of lenders;
   selecting and providing, by a lender in the pool of lenders, one or more credit products for the transaction from the pool based on the triplet risk score for the transaction;
   displaying the one or more selected credit products to the consumer so that the consumer accepts the credit product from the one or more selected credit products; and
   completing the purchase of the good or the service by the consumer using the credit product accepted by the consumer.

2. The method of claim 1 wherein the credit product is presented to a purchaser at a point-of-sale.

3. The method of claim 1 wherein the merchant may participate in the credit product.

4. The method of claim 1 wherein the pool of lenders provide a plurality of credit products.

5. The method of claim 4 wherein the purchaser can elect a combination of two or more credit products.

6. The method of claim 1 wherein the combined risk score comprises a merchant data and score value, a merchandise data and score value, and a purchaser data and score value.

7. The method of claim 6 wherein the pool of lenders provides a credit product from a plurality of existing credit products.

8. A system, comprising:
   a computer system having a processor, memory and instructions that is configured to:
   receive a consumer indication of a purchase of a good or a service; generate a triplet risk score for a transaction with the consumer for purchase of the good or the service, the triplet risk score representing analysis of a merchant risk for the transaction, a purchaser risk for the transaction including credit worthiness of the consumer, and a product risk for the transaction and provide the triplet risk score for the transaction through a communication link to a pool of lenders;
   the lender pool having a plurality of lenders wherein a lender in the pool of lenders selects and provides one or more credit products for the transaction from the pool based on the triplet risk score for the transaction; and
   the computer system further configured to display the one or more selected credit products to the consumer so that the consumer accepts a credit product from the one or more selected credit products and complete the purchase of the good or the service by the consumer using the credit product accepted by the consumer.

9. The system of claim 8 further comprising a point of sale system that presents the credit product to the purchaser.

10. The system of claim 8, wherein the merchant may participate in the credit product.

11. The system of claim 8, wherein the pool of lenders provide a plurality of credit products.

12. The system of claim 8, wherein the combined risk score comprises a merchant data and score value, a merchandise data and score value, and a purchaser data and score value.

13. The system of claim 12, wherein the pool of lenders provides a credit product from a plurality of existing credit products.

* * * * *